(12) United States Patent
Swain et al.

(10) Patent No.: US 6,306,319 B1
(45) Date of Patent: Oct. 23, 2001

(54) METHOD OF DETERMINING WEAR

(75) Inventors: Robert D. Swain, Lake Barrington, IL (US); Ralph A. Stanziola, Neshanic Station, NJ (US)

(73) Assignee: Chroma Corporation, McHenry, IL (US)

( * ) Notice: Subject to any disclaimer, the term of this patent is extended or adjusted under 35 U.S.C. 154(b) by 0 days.

(21) Appl. No.: 09/361,632

(22) Filed: Jul. 19, 1999

(51) Int. Cl.$^7$ .................................. B29B 7/00; B29B 7/88
(52) U.S. Cl. .................................. 264/40.1; 264/211.21; 264/328.18; 264/349; 366/142
(58) Field of Search ..................... 264/40.1, 73, 78, 264/173.18, 211.21, 349, 328.18; 425/136, 168; 366/131, 132, 142

(56) References Cited

U.S. PATENT DOCUMENTS

| 2,454,116 | 11/1948 | Ames et al. . | |
|---|---|---|---|
| 3,087,238 | 4/1963 | Nottingham | 29/407 |
| 3,845,662 | 11/1974 | Surgina et al. | 73/358 |
| 4,491,418 | * 1/1985 | Maillefer . | |
| 4,604,251 | 8/1986 | Kuhman | 264/40.2 |
| 4,684,488 | 8/1987 | Rudolph | 264/40.2 |
| 5,246,643 | * 9/1993 | Inaba et al. . | |
| 5,486,327 | * 1/1996 | Bemis et al. . | |
| 5,723,517 | 3/1998 | Campo et al. | 523/303 |

FOREIGN PATENT DOCUMENTS

4445352-C1 * 1/1996 (DE) .

* cited by examiner

Primary Examiner—Jill L. Heitbrink
(74) Attorney, Agent, or Firm—Leydig, Voit & Mayer, Ltd.; John M. Augustyn

(57) ABSTRACT

The method uses color to determine the wear of the screw and barrel of the molding machine. The method measures the color and/or color variation to determine the wear. A first material of a first color and a second material of a second color are fed into the machine to create a third material with a third color. The third material is either extruded to form a part or is injected into a mold to form a part. The color of the part is then measured with a measuring device, such as, spectrophotometer. The color will change as the screw and barrel wear. The color value would then be compared with previous color values to determine the amount of wear.

49 Claims, 5 Drawing Sheets

METHOD OF DETERMINING WEAR

FIELD OF THE INVENTION

The invention relates to a method for determining wear and more particularly a method of using color as an indicator of the degree of both barrel and screw wear in plastic processing equipment such as extruders and reciprocating injection molding machines.

BACKGROUND OF THE INVENTION

Extruders and injection molding machines use a screw to feed material through the machines. The screw has a flight and a channel. In addition, the screw is located inside a barrel. As the screw rotates inside the barrel, the flight advances the material through the barrel. For plastic material, the screw flight is designed to cause the material to melt as it advances through a heated barrel. In addition, the screw may be used to mix two or more materials as they are moved through the barrel. Furthermore, the machine may use several screws.

The machine is designed and manufactured with a predetermined distance between the screw flight and the barrel. During use, the movement of material through the screw and barrel causes wear which increases the distance between the screw flight and the barrel. If the material is abrasive, the wear occurs more quickly.

Generally an increase in wear creates a reduction of the shear rate on the polymer, resulting in less mixing to occur in the barrel. This results in molten polymer with poor homogeneity. A non-homogeneous product causes the risk of fabricating plastic parts which will fail to meet performance criteria established on the physical properties. Preventive maintenance procedures to monitor screw and barrel wear presently used by the industry require machines to be shut down, disassembled, and physically measured to determine actual wear. This process is time consuming, and generally requires one-half to one full day of lost productivity and the use of high cost maintenance labor, causing the process to be expensive.

A method is needed which can be more efficient and more economical for the determination of screw wear.

SUMMARY OF THE INVENTION

In general, the present invention provides a facile method for evaluating the extent of wear, and for determining when to repair, plastic processing equipment including a screw and barrel, by first establishing a color standard and then evaluating what color results when color samples (made from two differently colored thermal plastics) are processed in such equipment at spaced intervals over time. Because of the decreasing homogeneity that results as the mixing in such equipment deteriorates over time through wear, the resulting color will correspondingly deteriorate in comparison to the color standard and in relation to color samples obtained using equipment at earlier times. The color of the samples can be subjectively and/or objectively evaluated to provide a basis for determining when the equipment should be repaired.

Pursuant to one illustrative embodiment, a first material of a first color and a second material of a second color are fed into the machine to create a resultant third material with a third color. The resultant third material is either extruded or is injected into a mold to form a part.

More specifically, in this embodiment, a precolored thermoplastic compound is fed into a machine with a custom formulated concentrate (or master batch) of a different color. When these two products are mixed homogeneously, these products will produce a fabricated plastic part uniformly colored in an entirely different shade than the colors of either component.

The color of the part is then measured with a measuring device, such as, for example, a spectrophotometer. The color will change as the screw and barrel wear. The color value obtained may then be compared with previous color values, obtained at other times during the equipment use, to determine the amount of wear.

Specifically, the method would be performed when the machine is new (or first used or repaired) in order to obtain an initial or first color value. The first value would be placed on a graph with operating time along the X axis and color along the Y axis. After the specified interval of operating time, the method would be performed again to obtain a second color value and this second value would be placed on the graph. Similarly, the method would be performed after each specified interval of operating time to obtain the third value, fourth value, etc. The values would then be connected with a line to form a curve. The user would analyze the curve to determine when the color and wear has diminished below an acceptable level. The machine would then be disassembled and rebuilt.

In this fashion, a straightforward method for evaluating plastic processing equipment wear is provided which avoids the expense and down time of prior techniques. This method can be carried out in a number of different ways, providing as rigorous and objective analysis as the user considers appropriate for the particular equipment repair sequence. Moreover, this method can take advantage of color compounders who have the ability to insure that the proper color samples are used each time for this comparative method, as well as to provide the color change analysis and determination, as the equipment user deems appropriate.

DESCRIPTION OF THE EMBODIMENTS

The invention involves a method which uses color to determine the wear of the screw and barrel. The method can be performed quickly and does not require disassembling the machine or the measurement of its components. The method measures the color and/or color variation to determine the wear.

In a precolored thermoplastic compound, the colorant has been homogeneously distributed throughout the polymer during the melt compounding process known as precolor compounding. This compound can be changed to a new color by adding a new colorant. For example, a precolor yellow compound may be changed to a green compound simply through the addition of a blue colorant to the formulation. Therefore, a standard for optimum homogeneity can be established by preparing a precolored green compound, based on both the yellow and blue colorants via the melt-compounding process.

This invention utilizes the principle that normal and continuous use of plastic processing equipment erodes the mixing capability inherent at time of equipment purchase. Thus, as the wear continues, the capability of the equipment to deliver melt homogeneity is also compromised.

A homogenous precolor plastic compound is mixed with a concentrate (or master batch) of a second color. A resultant third material with a resultant third color is created and the color of this third color will depend on its resulting homogeneity.

The color concentrate includes a colorant. The colorant may be a pigment, a dye, a combination of pigment and dye, or other colored material.

A precolored yellow thermoplastic compound provides a "background color" that is homogeneous. The addition of an "accent color" such as blue in the form of a concentrate (or master batch) requires complete mixing to attain the homogeneity of the resultant third material which is green. Less than complete mixing will leave "islands" or "swirls" of the concentrate in the resultant third material. In other words, the result is a non-homogeneous background color. If all of the colorant contained in the concentrate was uniformly mixed into the homogeneous precolor compound (background color), the resultant third color will equal the color of the standard developed as the homogeneous standard.

If the mixing is compromised and the concentrate (the accent color) is not spread homogeneously throughout the homogeneous precolored compound, the third color will be less than the color of the homogeneous standard. The further the mixing action is compromised, the greater the loss of the third color. The amount of colorant or the like in the concentrate remains identical for each test. Thus, the loss of mixing capability in the processing equipment produces molten polymer containing "islands" or "swirls" of incompletely mixed colorant. This non-homogeneity of the third color manifests itself through a change in color.

Figure 1:
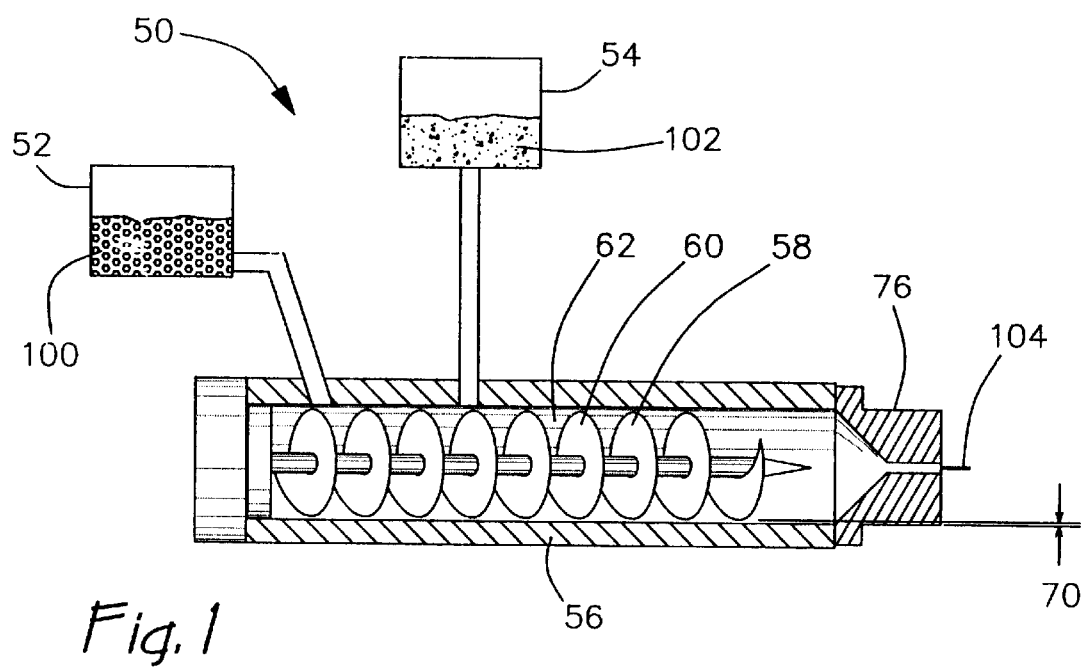
FIG. 1 is a partial schematic cross-sectional view of an extruder or an injection molding machine.

FIG. 1 shows certain portions of an extruder or a reciprocating injection screw machine 50. The machine 50 includes a first hopper or feeder 52, a second hopper or feeder 54, a barrel 56 and a screw 58. The screw 58 has a flight 60 and a channel 62. The screw 58 is located inside the barrel 56 and the screw flight 60 is separated from the barrel 56 by a distance 70. The machine is designed and manufactured with a predetermined distance 70 between the screw flight 60 and the barrel 56. The screw 58 rotates inside the barrel 56 and the screw flight 60 advances the material through the barrel 56. The material is then fed through a die 76 or injected into a mold for injection molding.

The method for determining wear is performed as follows. A first material 100 of a first color and a second material 102 of a second color are fed into the machine to create a third material 104 with a third color. For example, the first material 100 may be plastic pellets which are yellow. The second material 102 may be a color concentrate which is blue. The color concentrate may be in a pellet form or may be in a liquid form. The yellow material mixes with the blue material to create a resultant third material 104 which is green.

Specifically, the first material is a precolored thermoplastic polymer which is fed into a machine with a second material which is a custom formulated concentrate (master batch) of a different color. The concentrate may be in the solid pelletized state or in the liquid form. The color concentrate includes a colorant. The colorant may be a pigment, a dye, a combination of pigment and dye, or other colored material. The precolored yellow material is mixed/blended with a blue concentrate to form fabricated plastic parts which are green.

The first material 100 is fed into the machine using the first hopper 52 and the second material 102 is fed into the machine using a volumetric feeder or a gravimetric feeder 54. In another embodiment, the first material and second material may be premixed prior to loading in the first hopper 52. For example, the first material may be yellow plastic pellets which are premixed with blue plastic pellets to create a mixture of yellow pellets and blue pellets.

The first and second materials 100, 102 are advanced through the screw 58 and barrel 56 of the machine. As the materials are advanced, the materials melt and are mixed together to form a resultant third material 104 with a third color. The resultant third material 104 is either extruded to form a part or is injected into a mold to form a part.

The color of the part is then measured subjectively, or, more preferably objectively, with any suitable device. Illustrative examples of useful measuring devices include spectrophotometers, 3 or 4 filter tristimulus colorimeters, spectrocolorimeters, electronic video systems, or still frame camera-based systems.

The color may be measured by any system desired, preferably using L*a*b* values which are known by persons skilled in the art. It is known that color applied to a surface can be defined in terms of a color in a three-dimensional color space or color map. The ideal color space is a cylinder. The color sphere is defined by the lightness ("L") value, the red/green ("a") value, and the blue/yellow ("b") value. See, for example, Color Measurements Instrument Manual, X-Rite® No. 948-968 (1990) and Commission International de l'Eclairage as the CIE 1976 L*a*b* Color Space. Thus, the three values when combined define a color of an object as seen by the human eye. Any given color can then be measured in terms of the "L*a*b*" value and expressed in relation to the L*a*b* value of a prior measurement. In addition, color may be expressed by C* (chroma) or by h (hue angle). The value C* equals $$\sqrt{a^{*2} + b^{*2}}.$$

The value h equals the arctangent of b*/a*. Furthermore, color change can be expressed by ΔE which equals $$\sqrt{(L_1^* - L_2^*)^2 + (a_1^* - a_2^*)^2 + (b_1^* - b_2^*)^2}.$$

The color of the fabricated plastic parts will change as the screw 58 and barrel 56 wear. Specifically, color changes because less mixing occurs as the distance 70 between the screw 58 and the barrel 56 increases causing the colorants of the second material to become less homogeneously distributed in the third resultant material.

Figure 2:
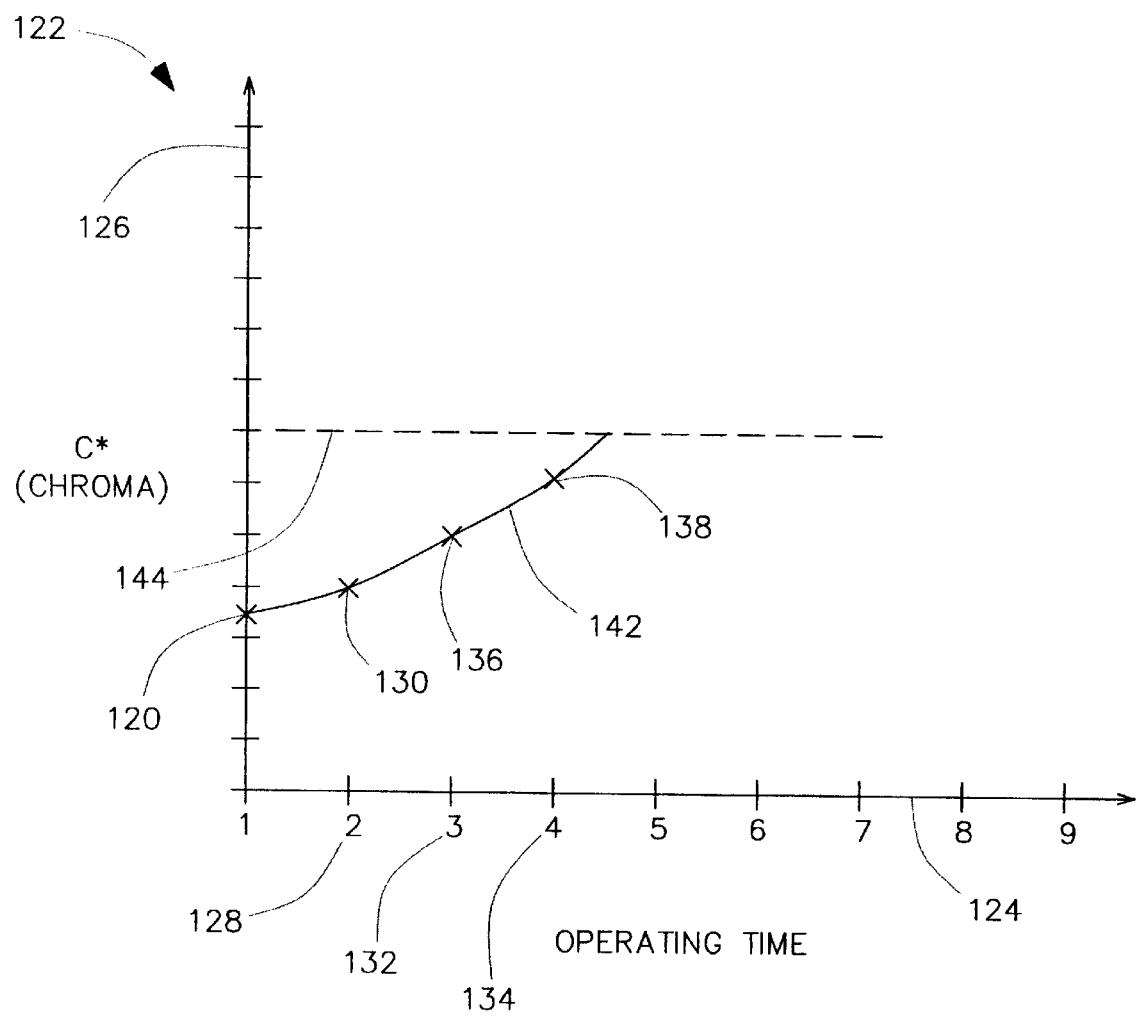
FIG. 2 is a graph showing the wear of the machine by plotting color (C* (chroma)) versus specified intervals of operating time.

The color value would then be compared with previous color values to determine the amount of wear. Specifically, the method would be performed on the machine 50 when the machine is new (or first used or repaired) in order to obtain a first or initial color value 120. In this example, the color value is C* (chroma). Referring to FIG. 2, the first value 120 would be placed on a graph 122 with operating time 124 along the X axis and color 126 along the Y axis. After the specified interval of operating time 128, the method would be performed again to obtain a second color value 130 and this second value 130 would be placed on the graph 122. Similarly, the method would be performed after each additional interval of operating time 132, 134 to obtain the third value 136, fourth value 138, etc. The values would then be connected with a line to form a curve 142. In this example, the first material is a precolored compound and the second material is a color concentrate. The first color is yellow, the second color is blue and the resultant third color is green. The curve moves upward because the yellow becomes more dominant in the third color and makes the resultant third (green) color brighter and more yellow. The user would analyze the curve 142 to determine the time when the color, and thus wear, would reach a predetermined unacceptable value 144. The machine would then be disassembled and rebuilt at the specified time.

Figure 3:
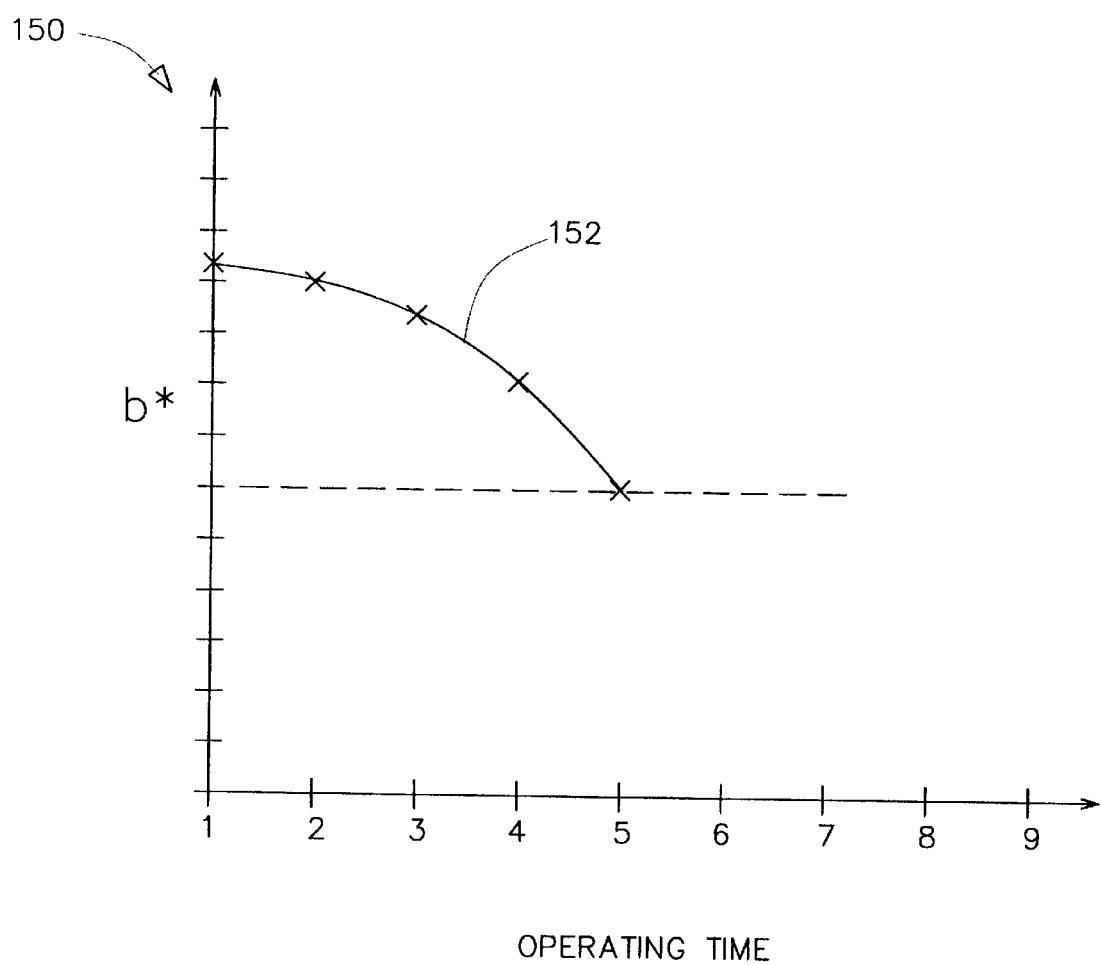
FIG. 3 is a graph showing the wear of the machine by plotting color (b*) versus specified intervals of operating time.

In other examples, and depending upon the colors used, the color value a\*, b\*, L\*, h, or ΔE may be used as the color value to be placed upon the graph. For example, referring to FIG. 3, the graph 150 shows an example where the color value is b\* and the curve 152 moves downward. In this example, the first material is a precolored compound and the second material is a color concentrate. The first color is white, the second color is blue and the resultant third color is light blue. The curve 152 moves upward because the white becomes more dominant in the resultant third color and makes the resultant third color duller and more white.

In another embodiment, the color values would be compared to the color value of a color chip. In an additional embodiment, the color values would be compared to the color value of a control part with a specified control color.

In another embodiment, a mathematical equation would be created which represents the relationship between the color values and the time period. The equation would be used to determine the time when the color will reach a predetermined value. The machine would then be disassembled and rebuilt at the specified time. The equation could be created using a computer and appropriate software.

Figure 4:
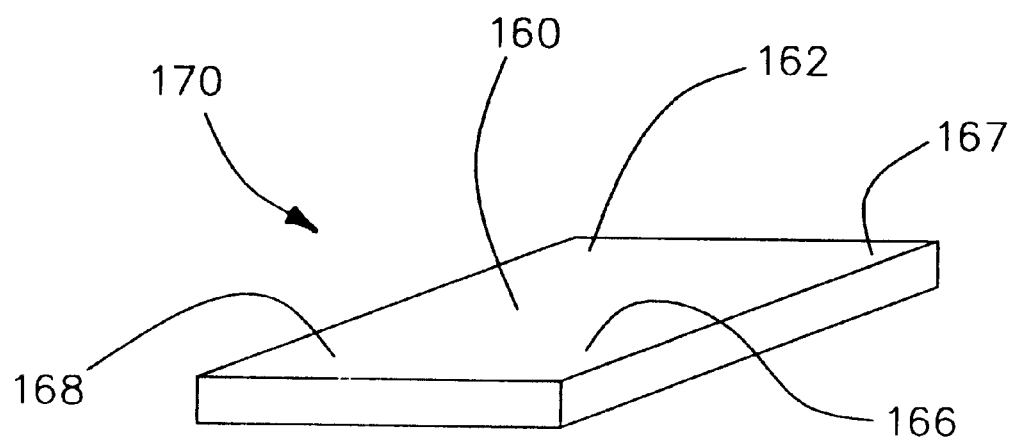
FIG. 4 is a perspective view of a part showing some of the locations where color may be measured to obtain differences in color.

In another embodiment, the color is measured at several locations on the part and the values are compared with a standard for differences. If the differences in color values at the locations are unacceptable, then these differences would indicate wear in the machine. As the machine wears, the mixing decreases and the difference between color values at various locations increases. For example, referring to FIG. 4, the color is measured at five locations, 160, 162, 164, 166, 168 on a specified area on the part 170. The color values are compared with a standard and if unacceptable differences in color values exist, then the machine would be disassembled and rebuilt.

Figure 5:
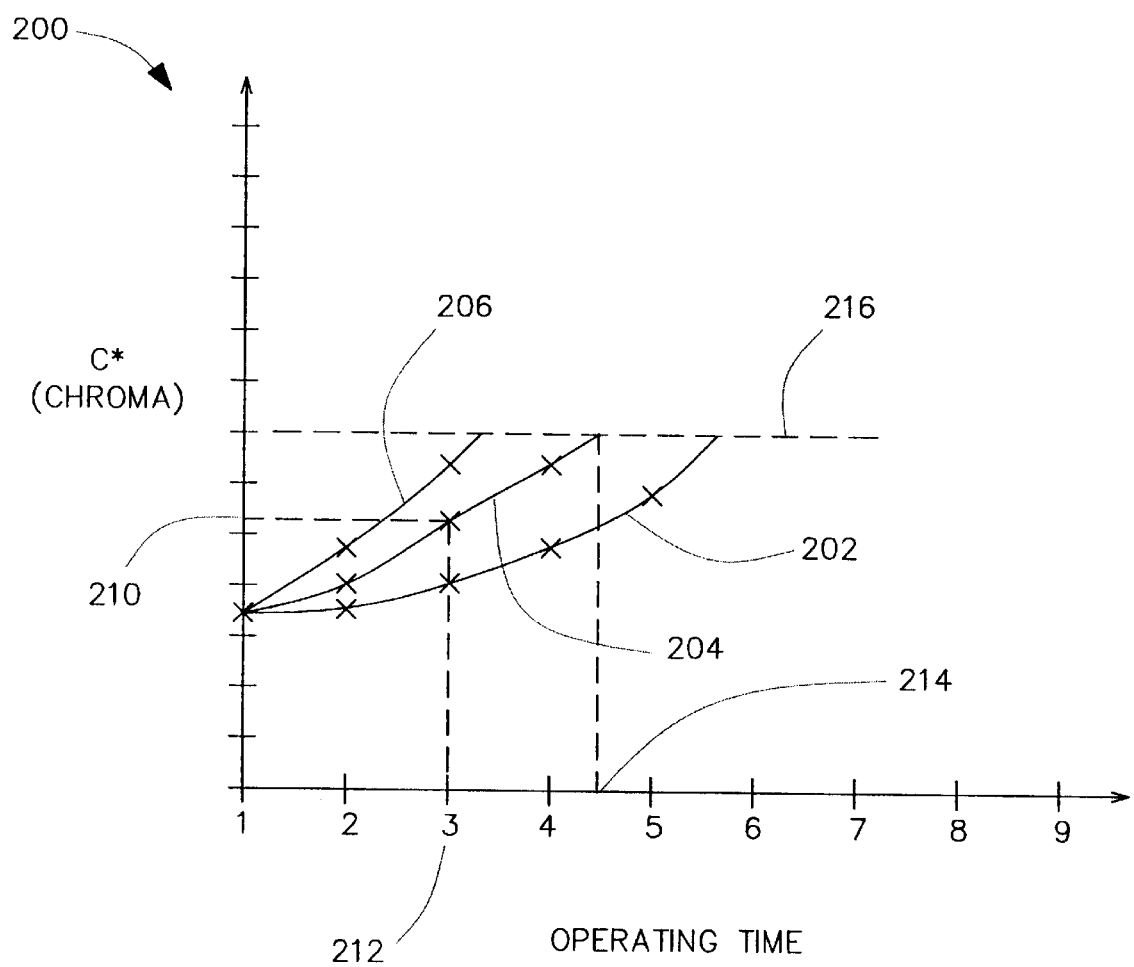
FIG. 5 is a graph showing the wear of the machine by plotting color (C* (chroma)) versus specified intervals of operating time for processing different types of material.

In another embodiment, a graph or equation is created for a particular model number of a machine by a specific manufacturer. For example, as shown in FIG. 5, a graph 200 is created for a machine by manufacturer X with model number Y. The graph may have several lines for different wear rates depending on the abrasiveness of the first and second materials. For example, the graph 200 may have a first line 202 for low abrasive materials, a second line 204 for medium abrasive materials, and a third line 206 for high abrasive materials. The manufacturer or a service company would create the graph for a specific model number using the method noted above. After a specific period of operating time, the method would be performed to obtain the color value 210 of the third color. After obtaining the color value 210, the appropriate line is selected, e.g. medium abrasive materials 204, and the color value 210 and time 212 are located on the line 204. By knowing the location on the line, the time 214 when the machine would reach the predetermined value 216 of unacceptable color can be determined. This method could also be performed using equations as noted above.

In a further embodiment, the first material with a first color and the second material with a second color are processed in the machine to obtain a resultant third material with a third color. The machine is then purged or cleaned. A fourth material is then processed in the machine. The fourth material contains the same colorant at the same percentage as the resultant third material, except the fourth material is completely homogeneous prior to processing in the machine. Thus, the fourth material with the fourth color will become the homogeneous color standard. More specifically, the fourth color represents a homogeneous color standard for the particular thermal history and operating conditions of the machine. If the machine has been in use for a period of time, then this color standard (resultant fourth color) would represent the machine when it was new and was providing a completely homogeneous output. The resultant third color is then compared with the color standard (resultant fourth color) to determine the difference between the color values and thus, the wear.

In another embodiment, the method may be performed on a new machine or on a rebuilt machine in order to certify that the machine is performing at an acceptable level. Specifically, the first material with a first color and the second material with a second color are processed in the machine to obtain a resultant third material with a third color. The third color is measured and compared to a color chip, a control part with a control color, and/or with a fourth color as noted herein. In addition, the fourth material with the fourth color may be processed in the machine to obtain a resultant fourth color for the particular thermal history and operating conditions of the machine. The resultant fourth color is then compared with other color values as noted herein. If the machine is new, then the resultant third color and/or resultant fourth color may be compared with color values of other new machines. If the machine has been rebuilt, then the resultant third color and/or resultant fourth color may be compared with color values obtained prior to rebuilding the machine.

Preferably, the first material should have an opaque first color. However, in another embodiment, the first material may be a natural resin with a natural first color and the second material may be a color concentrate with a second color. The natural resin with the natural first color is relatively transparent and provides a poorer base for the second color as opposed to an opaque base. However, the color value of the resulting third color can be measured and the color can be compared with previous color values to determine the amount of wear. In this embodiment, the user can continue to run saleable parts with the usual color, as opposed to parts with a special color for the wear test which would not be saleable due to the special color. Indeed, by adopting a test protocol based upon the color and part most normally made on the machine being tested, the timing of the testing can be more easily scheduled, causing little, if any, disruption to the desired production schedules. In yet another embodiment, the first material may be a natural resin with a natural first color and the second material may be a colorant with a second color. The colorant may be a pigment, a dye, a combination of pigment and dye, or other colored material. The pigment may be dry or a paste.

Any combination of colored materials, whose calorimetric values (all or any) would be sensitive to change, may be used. For example, other color combinations may be used as shown in the table below.

| First Color of First Material | Second Color of Second Material | Third Color of of Resultant Third Material |
|---|---|---|
| Red | Yellow | Orange |
| Red | Green | Grey |
| Green | Blue | Blue Green |
| Blue | Red | Violet |
| White | Black | Grey |
| White | Blue | Light Blue |

Certain combinations have greater sensitivity to non-homogeneity.

In order to obtain accurate results for the color values, as is desired in the most preferred embodiment of this invention, so as to achieve the maximum benefits, all variables should be eliminated or controlled. For example, the first and second materials should be the same at each interval measurement. Specifically, the first material should be the same product from the same manufacturer for each interval measurement. Similarly, the second material should be the same product from the same manufacturer for each interval measurement. The first material and the second material should be of a uniform and consistent pellet size (or particle size) and configuration. In addition, the color (hue), the strength (chroma), and the shade of the first and second materials require tight color tolerance control. If a different product and/or manufacturer is used, variables are introduced into the method, such as, the size and composition of the pellets. Furthermore, the same mold should be used for each interval measurement. If a different mold is used, variables are introduced into the method, such as, differences in surface texture. In addition, the operation of the machine should be controlled, for each interval measurement, such as, the back pressure, the screw speed, holding time, dwell time, cylinder temperature, size of nozzle and nozzle shape.

The method may be performed by a service company as a service for the user of the machine. The service company would perform the interval measurements and provide the data and recommendations to the user. Inasmuch as precolor services are available and being used to provide color concentrates for normal production, such services have the expertise to provide appropriate test protocols and color samples.

In some situations, the method may be completely performed by the user if the user has the skills and equipment. In other situations, some steps in the method may be performed by the user, while other steps may be performed by the service company. For example, the service company can provide the user with the first and second materials separately or in a premixed form. The user then performs the method at the specified time interval and sends the fabricated part to the service company for analysis, including measurement of the color intensity value. The service company then graphs, or otherwise evaluates, the values and provides the data and recommendations to the user.

In another embodiment, the user supplies the first and second materials and performs the method at the specified time interval. The user then sends the part to the service company for analysis, including measurement of the color intensity value. The service company then graphs, or otherwise evaluates, the values and provide the data and recommendations to the user.

In yet another embodiment, the method may be performed on a new machine by the manufacturer or on a rebuilt machine by the rebuilder in order to certify that the machine is performing at an acceptable level.

While certain features of the invention have been illustrated and described herein, modifications, substitutions, changes, and equivalents may occur to those skilled in the art. It is, therefore, to be understood that the appended claims are intended to cover all such modifications and changes as fall within the true spirit of the invention.

What is claimed is:

1. A method for determining wear in a machine comprising:
   a. providing a first material of a first color;
   b. providing a second material of a second color;
   c. melting the first and second materials in the machine to obtain a third material of a third color;
   d. obtaining the color of the third color to obtain a first color value;
   e. obtaining a comparison of the first color value with a second color value, a difference between the first color value and the second color value indicates wear in the machine.

2. The method as in claim 1 wherein the second color value is obtained from a color chip.

3. The method as in claim 1 wherein the second color value is obtained from a control part.

4. The method as in claim 1 wherein the second color value is obtained from a predetermined line on a graph.

5. The method as in claim 1 wherein the second color value is obtained from a predetermined mathematical equation.

6. The method as in claim 1 wherein the machine has a screw and a barrel which are separated by a distance, the difference between the first color value and the second color value indicates a change in the distance and wear in the machine.

7. The method as in claim 1 further comprising: repeating steps a–c after a specified period of time and obtaining the color of the third color to obtain a second color value.

8. The method as in claim 7 further comprising the step of creating a graph with color value on one axis and time on the other axis, placing the first color value and second color value on the graph and forming a line with the values.

9. The method as in claim 8 further comprising the step of extrapolating the line beyond the values to determine the time when the color value will reach a predetermined value.

10. The method as in claim 7 further comprising the step of repeating steps a–c after a second specified period of time and obtaining the color of the third color to obtain a third color value.

11. The method as in claim 10 further comprising the step of repeating steps a–c after a third specified period of time and measuring the color of the fourth color to obtain a fourth color value.

12. The method as in claim 10 further comprising the step of creating a graph with color value on one axis and time on the other axis, placing the color values on the graph and forming a line with the values.

13. The method as in claim 12 further comprising the step of extrapolating the line beyond the values to determine the time when the color value will reach a predetermined value.

14. The method as in claim 7 further comprising creating a mathematical equation which represents the relationship between the values and the time period.

15. The method as in claim 14 wherein the equation is used to determine the time when the color value will reach a predetermined value.

16. The method as in claim 1 wherein the first material is in pellet form and the second material is in pellet form.

17. The method as in claim 16 wherein the first material and second material are premixed.

18. The method as in claim 1 wherein the first material is in pellet form and the second material is in liquid form.

19. The method as in claim 1 wherein the first material is a precolored compound and the second material is a color concentrate.

20. The method as in claim 19 wherein the first color is yellow, the second color is blue and the third color is green.

21. The method as in claim 19 wherein the first color is white, the second color is blue and the third color is light blue.

22. The method as in claim 1 wherein the first material is a natural resin and the second material is a color concentrate.

23. The method as in claim 1 wherein the first material is a natural resin and the second material is a colorant.

24. The method as in claim 23 wherein the colorant is selected from the group consisting of: a pigment, a dye, and a combination of a pigment and a dye.

25. The method as in claim 1 wherein the machine is an extruder.

26. The method as in claim 1 wherein the machine is an injection molding machine.

27. The method as in claim 1 wherein the third material is molded into a part.

28. The method as in claim 27 wherein the step of obtaining the color is performed on the part.

29. The method as in claim 1 wherein step d is performed using a measuring device.

30. The method as in claim 29 wherein the measuring device is a spectrophotometer.

31. The invention as in claim 4 wherein the predetermined line is obtained by measuring the color of the third material at various intervals of time.

32. The invention as in claim 4 wherein the predetermined line corresponds to the abrasiveness of the first material or the second material.

33. The invention as in claim 32 wherein a second predetermined line corresponds to the abrasiveness of a different first material or second material.

34. The invention as in claim 5 wherein the predetermined equation is obtained by measuring the color of the third material at various intervals of time.

35. The invention as in claim 5 wherein the predetermined equation corresponds to the abrasiveness of the first material or the second material.

36. The invention as in claim 35 wherein a second predetermined equation corresponds to the abrasiveness of a different first material or second material.

37. A method for determining wear in a machine comprising:

a. providing a first material of a first color;

b. providing a second material of a second color;

c. melting the first and second materials in the machine to obtain a third material of a third color;

d. forming the third material into a part;

e. obtaining the color of the third color at a first location on the part to obtain a first color value and obtaining the color of the third color at a second location on the part to obtain a second color value;

f. obtaining a comparison of the first color value with the second color value.

38. The method as in claim 37 wherein the machine has a screw and a barrel which are separated by a distance, the difference between the first color value and the second color value indicates a change in the distance and wear in the machine.

39. The method as in claim 37 wherein the first material is in pellet form and the second material is in pellet form.

40. The method as in claim 39 wherein the first material and second material are premixed.

41. The method as in claim 37 wherein the first material is in pellet form and the second material is in liquid form.

42. The method as in claim 37 wherein the first color is yellow, the second color is blue and the third color is green.

43. The method as in claim 37 wherein the machine is an extrusion molding machine.

44. The method as in claim 37 wherein the machine is an injection molding machine.

45. The method as in claim 37 wherein the third material is molded into a part.

46. The method as in claim 37 wherein step e is performed using a measuring device.

47. The method as in claim 46 wherein the measuring device is a spectrophotometer.

48. A method for determining wear in a machine comprising:

a. providing a first material of a first color;

b. providing a second material of a second color, which will be melted with the first material in the machine to obtain a third material of a third color;

c. obtaining the color of the third color to obtain a first color value;

d. obtaining a comparison of the first color value with a second color value, a difference between the first color value and the second color value indicates wear in the machine.

49. A method for determining wear in a machine using a first material of a first color and a second material of a second color which are melted in the machine to obtain a third material of a third color, the method comprising:

a. at a first period of time, obtaining a first sample of the third material and measuring the color of the third color to obtain a first color value;

b. obtaining a comparison of the first color value with a second color value, a difference between the first color value and the second color value indicates wear in the machine.

* * * * *